Figure 1:
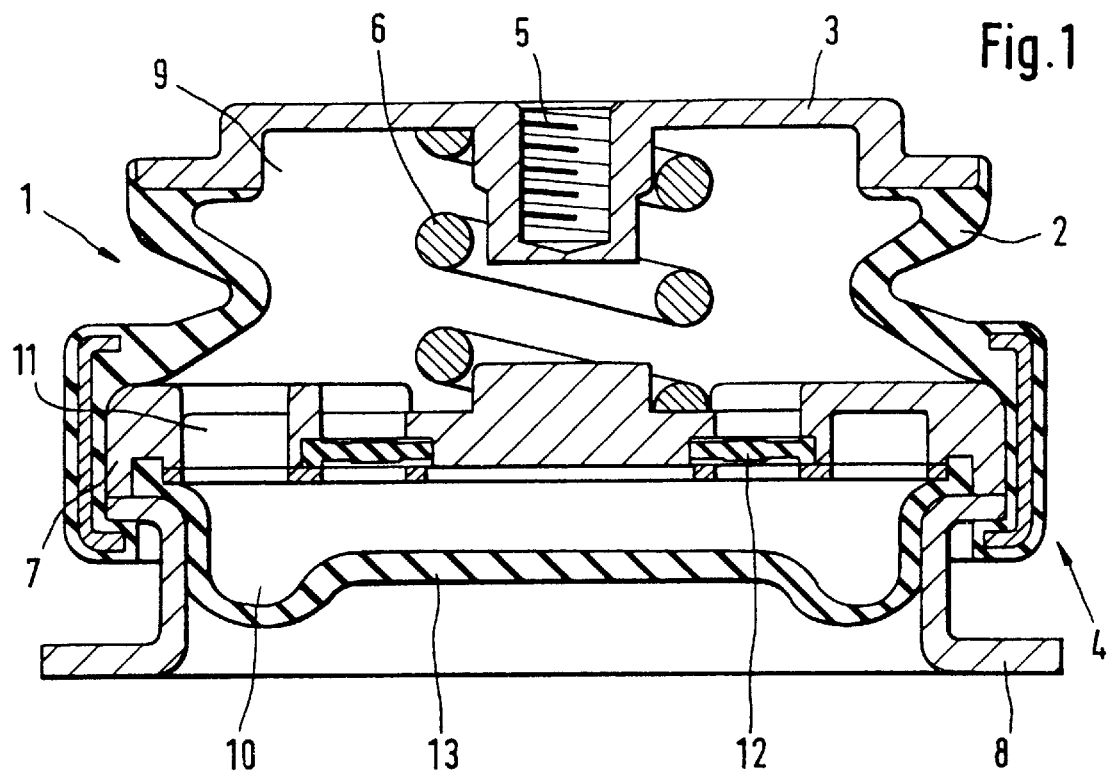

United States Patent [19]
Wolf et al.

[11] Patent Number: 5,860,638
[45] Date of Patent: Jan. 19, 1999

[54] BEARING FOR DAMPING OSCILLATING/ VIBRATING MASSES

[75] Inventors: Franz Josef Wolf, Bad-Soden Salmünster; Stefan Nix, Wächtersbach, both of Germany

[73] Assignee: Woco Franz-Josef Wolf & Co., Bad Soden-Salmunster, Germany

[21] Appl. No.: 590,379

[22] Filed: Jan. 25, 1996

[51] Int. Cl.⁶ ...................................................... F16F 5/00
[52] U.S. Cl. ................... 267/140.13; 267/140.3; 267/226
[58] Field of Search ................... 267/140.13, 33, 267/34, 140.2, 259, 64.27, 140.14, 140.3, 140.4, 221, 226

[56] References Cited

U.S. PATENT DOCUMENTS

| 3,874,646 | 4/1975 | Vernier | 267/140.13 |
| 3,883,101 | 5/1975 | Verier | 267/140.13 |
| 3,947,007 | 3/1976 | Pelat | 267/140.13 |

*Primary Examiner*—Lee W. Young
*Attorney, Agent, or Firm*—Lowe Hauptman Gopstein Gilman & Berner

[57] ABSTRACT

A bearing is provided to dampen oscillating/vibrating masses and which comprises a resilient support body (2), an adapter (3) to connect the bearing with the oscillating/vibrating mass and a housing (4) frictionally locking the bearing against a retaining means, the bearing being fitted with a spring system (6) to receive loads substantially applied in the vertical direction.

7 Claims, 1 Drawing Sheet

BEARING FOR DAMPING OSCILLATING/VIBRATING MASSES

The present invention concerns a bearing with which to damp masses subject to displacements such as oscillations, vibrations, swinging and swaying, hereafter termed oscillating/vibrating masses, using a resilient support body defined in the preamble of claim 1, the expression "resilient" herein denoting a rubber-like elasticity.

Such bearings are used wherever the oscillations/vibrations of oscillatory/vibrational masses must be kept small, that is their oscillatory/vibrational amplitudes must be damped. At the same time such bearings are expected to dampen and isolate the sounds generated by the oscillating/vibrating masses, as well as said sounds' transmission and radiation into the environment.

Automotive construction is a typical application for such damping bearings, the aspect of user comfort assuming ever larger significance.

Accordingly such bearings frequently are installed as engine bearings, and as such they are subjected both to static and to dynamic loads which they transmit into the motor-vehicle body.

The static load is caused by the intrinsic engine weight, and the dynamic load is produced in several ways by engine oscillations/vibrations. Illustratively starting the engine or riding over rough terrain leads to low-frequency oscillations/vibrations with large amplitudes of perturbation, whereas the engine operating at high speeds produces high-frequency oscillations/vibrations at low perturbation amplitudes.

Because of the aforementioned high user-comfort requirement, such bearings must damp the oscillatory/vibrational amplitudes in all three coordinate directions.

Accordingly the reactions of such engine bearings ought to be as adjustable so the be as independent as possible from one another in all three space coordinates. This requirement leads to cross-purpose objectives. The typically used resilient support body of such bearings being statically pre-stressed by the weight of the supported engine, its spring constant increases and as a result acoustic comfort is substantially degraded, that is, acoustic damping is reduced and decoupled.

In addition the support body must guide the engine horizontally in the motor-vehicle body and must limit possible engine displacements in all three directions by means of stops. It is clear therefore that the support body must assume a plurality of functions, as a result of which on one hand it must be compliant, but on the other hand excessive compliance in the presence of static prestressing would lead to hardening and hence to acoustically degraded behavior and, in particular in the presence of dynamic loading, would lead to definite reduction in mechanical life.

All bearings of the species known at the present time to mount oscillatory/vibrational masses using a resilient support body are subject to this conflict in objectives, and accordingly when designing the support bodies of such bearings, tradeoffs must be accepted.

In the light of the above state of the art, it is the object of the present invention to remedy the cited technical problems by creating a bearing damping oscillatory/vibrational masses and to make it possible to design the bearing's reactions and acoustic behavior for loads in all three coordinate directions regardless of one another of these directions.

To solve this problem the invention offers the features stated in claim 1.

Advantageous embodiments of the invention are the objects of the further claims.

The invention is based on the concept to fit the bearing with a support body which is no longer subject to the undesired hardening, static prestressing effect, as a result of which this bearing may be adapted to all conceivable loads, whereby it can dampen oscillations/vibrations in all three spatial directions and will evince improved acoustic behavior.

For that purpose the invention provides a bearing to damp oscillating/vibrating masses which comprises a resilient support body, further an adapter affixed on and/or in the support body to connect the bearing to the oscillating/vibrating mass and a housing supporting the bearing in stationary manner, this bearing being also provided with an additional spring system to receive loads which are substantially vertical.

In other words, the bearing comprises a resilient support body no longer required to evince the function of absorbing static loads caused by the intrinsic weight of the oscillating/swinging mass because these substantially vertical loads will be received by the addition spring system in the bearing. The expression "substantially vertical load" denotes any conceivable one which is gravity-induced and which points in the direction of gravity. Thereby a bearing is advantageously created of which the resilient support body no longer needs matching the substantially vertical loads, as a result of which it can be designed to receive the far lesser dynamic load components and the loads exerted in the radial bearing direction while offering excellent acoustic behavior while nevertheless being compliant.

The spring system of the invention is physically separate from the support body but it cooperates with it in parallel to absorb loads in all three coordinate directions. In the process the spring system also receives primarily the substantially vertical loads, essentially therefore the static portions, further however also dynamic load components, whereas loads substantially orthogonal to the vertical loads are received by the resilient support body which for that purpose and, where appropriate only in zones, can be designed to be compliant in relation to the dynamic requirements.

The spring system and the support body may be adjusted or designed independently of each other to receive loads in all three coordinate directions.

The bearing comprises a spring-system introducing the load received by this spring system into the housing. The rest in turn rests against an affixation means.

Advantageously the spring system is mounted between the adapter on or in the support body and the rest, both adapter and rest preferably being metallic.

In this respect it is possible to mount the resilient support body between the adapter and the housing in such manner, and to adjust the additional spring system in such a way, that the support body remains unstressed even when the bearing is under static load. The resilient support body is appropriately connected by a direct rubber-metal composite to the metallic adapter and to the housing also preferably metallic. The support body kept unstressed in this manner remains free of hardening of its spring characteristic line and can be designed to be compliant and thereby evince a low dynamic spring constant and consequently high acoustic insulation.

However the invention also allows mounting the resilient support body in the zone between the adapter and the housing, and, where called for, in such manner that it shall be prestressed under static load. This embodiment is advantageous when compensation of the support-body prestressing may be expected from the likely dynamic loads. Such a feature illustratively may be advantageous when substantial dynamic loads are expected and which shall be supported, or partly supported, by the prestressed resilient support body.

In a further development of the invention, the resilient support body may evince, at least in some zones, thin walls in the vicinity of its affixation to the housing, whereby it shall be markedly compliant in said vicinity. Such a design is especially advantageous if, according to one embodiment of the invention, the spring system is mounted in an operational chamber filled with a hydraulic damping fluid, whereby said thin-walled zones of the resilient support body shall be able to deform in balancing manner also in the presence of only slight dynamic loads. A bearing evincing this design comprises a full-range compliant characteristic line, even in the zone of small dynamic loads, and accordingly high acoustic comfort is achieved.

In a further development of the invention, the resilient support body also can be mounted in its affixation zone between the adapter and the housing by spaced-apart segments of its outer periphery. In other words, in this case the resilient support body evinces a geometry of a star or spline hub/shaft whereby it extends in certain segments of its outer periphery from the affixation means to the surrounding housing but, in the adjoining segments of its periphery, is spaced from said housing while still being attached to the adapter, for instance by a rubber-metal bond and being joined to said housing only by the aforementioned thin-walled zone. The above hydraulic decoupling can then take place in such manner in the zone of said thin-walled attachment of the resilient support body to the housing that this thin-walled zone of the resilient support body shall respond to slight dynamic loads by a motion of deformation.

In yet another development of the invention, the spring system is advantageously mounted inside the operational chamber of a hydraulically damping bearing, the operational chamber communicating through a connection system with a balancing chamber of the bearing to balance the fluid. Thereby a system similar to a hydraulic bearing will be created, and hydraulic damping shall be achieved by means of the fluid exchange between the operational chamber and the balancing chamber.

For that purpose the connection system advantageously may assume the form of an annular channel fitted with communication-control means for instance in the form of valves, said annular channel being present in the above rest supporting the spring system. The bearing so implemented may be advantageously used to dampen oscillations/vibrations of a motor-vehicle internal combustion engine.

Accordingly the bearing of the invention is essentially characterized in that the support-body's support function is replaced in part or in whole by the spring system of the invention, whereby it is now possible to design as desired this support body for application-specific radial functions of damping, guidance and stops. As a result, the bearings of the present invention, compared with the known ones of the state of the art, offer substantially more hydraulic operational damping work with clearly increased pumping volume. Contrary to the case of known bearings, it is no longer necessary to design the support spring for vertical loads, for instance static engine loads, and accordingly wide design latitude for the support body and its matching to the applications is made possible. The bearing so created can be matched by its static and dynamic compliances to the various application requirements, and in most cases without being forced into tradeoffs.

Compared with the required additional components of known hydraulic bearings to carry out hydraulic decoupling, the support body of the invention may be made so thin that it also assumes hydraulic decoupling. Thereby economical assembly is achieved as well.

Within the scope of the present invention, the spring system basically may be in the form of all kinds of springs suitable for mechanical and automotive engineering. These are for instance standard springs, elastomer springs and bellows springs. Among the standard springs are the following: springs of circular, polygonal or shallow cross-sections; springs made of steel or plastic; helical-, spiral-, clip-, bar-, leaf-, C-, cable-, cup-, or membrane-springs; further springs with cylindrical, flat, convex, fitted or conic designs. The springs may be guided radially or be mounted in sliding manner.

Compared to standard springs, the elastomer springs accept higher compressive loads and as a result may be used in more compact form. By reinforcing such elastomeric compression springs with inelastic and adhesive inlays, the so-called profiled sheetmetals, the compressibility of such elastomeric compression springs can be further and substantially increased in known manner.

Elastomeric compression springs offer advantages especially where there is high radial deformation.

The invention is elucidated below by means of illustrative embodiments and in relation to the drawing.

Figure 2:
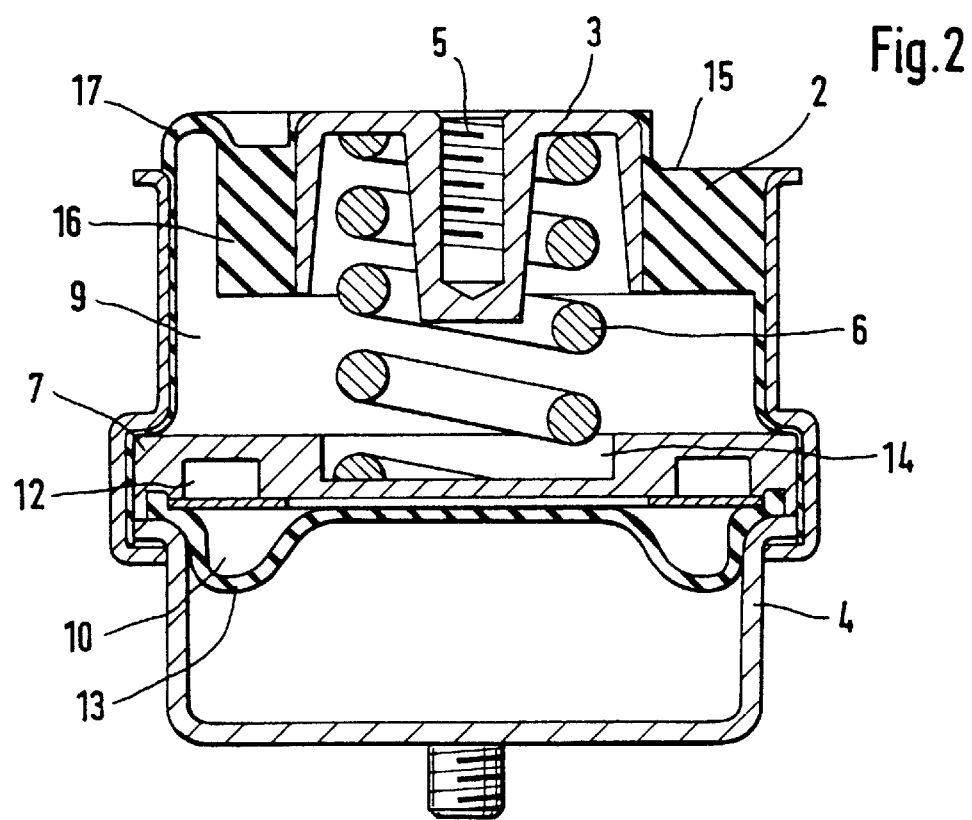

FIG. 1 is an axial section of a bearing of a first illustrative embodiment of the invention, FIG. 2 also is an axial section of a second illustrative embodiment of the invention.

As shown by FIG. 1, the bearing 1 of this embodiment essentially comprises a resilient support body 2 with an adapter 3 affixed to it to connect the bearing 1 to an omitted engine or drive unit of a motor vehicle, further a housing 4 by means of which the bearing rests against an affixation means such as the vehicle body.

In the shown embodiment, the bearing 1 is rotationally symmetrical and thereby the adapter 3 forms a disk with a threaded borehole 5 at its top side. The bearing 1 is connected by means of the threaded borehole 5 to an engine omitted from the drawing. In the region of its outer periphery and in that of its lower projecting flange, the adapter 3 is joined by a vulcanized rubber-metal composite to the support body 2.

A stepped centering means extends from the region of the threaded borehole 4 and from the lower side of the adapter 3, said centering means on one hand receiving the threaded borehole 5 and on the other hand providing a rest for the spring system 6 in the form of a helical spring. The steel helical spring 6 receives the vertical load component from an omitted engine in such manner that the support body 2 remains substantially unloaded. The transmission of the force is such that the helical spring 6 rests on a disk-shaped rest 7 mounted inside the bearing 1.

The rest 7 in turn is supported near its periphery by a cross-sectionally outwardly open U-channel 8 of the housing 4, as a result of which the force is transmitted through the said channel into a stationary retaining means, for instance a motor-vehicle body omitted from the drawing.

Appropriately the bearing 1 is mounted in such manner that the helical spring 6 is present inside a fluid-filled operational chamber 9 impermeably sealed relative to the outside by the adapter 3 and the support body 2. A balancing chamber 10 is formed underneath the rest 7 allowing fluid exchange by means of an annular channel 11 formed in the rest 7 between the damping fluid in the operational chamber 9 and the balancing chamber 10.

In the shown first embodiment of the invention, the rest 7 comprises a hydraulic decoupling means 12 assuring that even for slight dynamic loading hydraulic fluid will be precluded from being forced at all through the annular channel, but will flow only at substantial amplitudes of perturbation with corresponding volume displacements and in that resulting work of damping shall take place. The balancing chamber 10 is formed by a rolling membrane 13 mounted underneath the rest 7 and clamped between this rest 7 and the U-channel 8.

FIG. 2 shows the second embodiment of the bearing. In this second embodiment the housing 4 is similar to that shown in FIG. 1, namely being like a two-piece pot. The housing of this embodiment is divided in such manner in the support zone for the rest 7 that the two housing parts nest in each other. A rolling membrane 13 subtending the balancing chamber 10 is mounted underneath the rest 7.

In this second embodiment the rest 7 comprises a clearance 14 facing the operational chamber 9 and centering the helical spring 6 mounted in said operational chamber 9. The helical spring 6 rests by its upper side against an adapter 3 comprising at its top side a threaded borehole 5 for attachment with the omitted engine.

An offset similar to that found in the first embodiment is present underneath the adapter 3 to center the helical spring 6.

In the shown second embodiment, the adapter 3 evinces an axial contour with axially downward-pointing U-legs which are inside the fluid operational chamber but radially outside the helical spring 6, whereby the helical spring is received in the blind-hole type recess so formed. The resilient support body 2 is mounted in the vicinity of the outside periphery of this recess in a geometry deviating from that shown in FIG. 1.

It is easily seen that the geometry of the support body 2 in the right half of FIG. 2 differs from that in the left half of FIG. 2. In the right half of FIG. 2, the support body is mounted to entirely fill the annular space between the adapter 3 and the housing 4, whereas the mounting in the left half of the Figure is selected in such a way that a radial gap arises between the support body 2 and the housing 4, that is, a cylindrical, annular channel segment or a prismatic or cylindrical clearance is subtended. The full-volume segment of the support body 2 shown in the right half of the Figure serves as a sectorial rise 15 to radially guide the engine omitted from the drawing but affixed in the threaded borehole 5, that is, it guides the engine affixed to the bearing 1 in horizontal manner, whereas the stop 16 shown in the left-hand side of the figure limits the freedom of motion of the said engine. The rises 15 and stops 16 are distributed in alternating manner at the outer periphery of the support body 2 inside the housing 4, whereby they are similar in cross-sectional topview to a spline shaft or hub, the rises 15 extending radially fully outward whereas the stops 16 are radially shorter.

A cross-sectionally U-shaped expansion zone 17 of the support body 2 is provided at its load-side end in the particular segment of the stop 16. This partly narrow expansion region is used in the second embodiment as a hydraulic decoupling means, so that, when compared with the first embodiment of FIG. 1, the hydraulic decoupling means 12 in the rest 7 no longer need be provided in isolated manner.

In the case of only minor dynamic loads, fluid exchange will not take place between the operational chamber 9 and the balancing chamber 10 of the bearing 1 of FIG. 2, rather the partially thin zone 17 will slightly deform. In the range of larger dynamic loads an exchange of fluid does take place through the annular channel 11 between the operational chamber 9 and the balancing chamber 10. Damping work is performed thereby. In both embodiments the helical spring 6 receives the substantially vertical loads and as a result the resilient support body 2 will then be only substantially loaded by such forces. Accordingly the support body 2 is required to receive to a large extent the radial loads for instance arising from engine tipping due to its crankshaft rotation, and therefore, in comparison with known bearings, the conventional function assigned to the support body is now divided in the invention and in receiving the substantially vertical loads using the helical spring 6 and receiving the substantially radial loads using the support body 2. Compared with the support bodies of known hydraulically damped bearings, the support body 2 of the invention is much more compliant and thereby is able to carry out a larger, linear free path with an attendant substantially improved dynamic spring constant and substantially improved acoustic insulation.

The larger free paths also make it possible to achieve higher pumping volumes in the bearing, thus achieving higher hydraulic damping work. The compliance of the bearing 1 may be matched to particular applications and may exert a precisely tuned quenching effect in a frequency range of especial perturbation, the dynamic spring constant being minimal therein.

The bearing 1 of the invention is fitted with a hydraulic decoupling means integrated into the support body and thereby conventionally required, additional components and assembly steps can be dropped in the invention. Moreover the bearing 1 of the invention offers substantially higher temperature resistance than conventional ones, being thereby advantageous with hot internal combustion engines, and furthermore it sets elastically little, whereby it assures constant acoustic conditions.

The claims and the drawings are explicitly referred to regarding features not elucidated further in the above discussion.

We claim:

1. A damping bearing comprising:

a resilient support body (2);

an adapter (3) mounted on and/or in the support body (2) for connecting said damping bearing to an oscillating/vibrating mass;

a housing (4) which frictionally locks the bearing onto a vehicle body, the resilient support body (2) being mounted between the adapter (3) and the housing;

an operational chamber (9);

a balancing chamber (10);

a rest including a flow control means, said rest separating said operational chamber from said balancing chamber and allowing flow therethrough;

the bearing including a coil system receiving essentially vertically acting loads; and the coil spring being mounted in said operational chamber (9) between said adaptor and said rest.

2. Bearing defined in claim 1, characterized in that the spring system (6) is bodily separate from the resilient support body (2) but functionally cooperates with the support body (2) to receive loads directed in all coordinate directions.

3. Bearing defined in claim 1, characterized in that the bearing is fitted with a rest (7) supporting the spring system (6) and transmitting the load received by the spring system (6) into the housing (4).

4. Bearing defined in claim 1, characterized in that the spring system (6) is mounted between the adapter (3) and the rest (7), both said adapter and said rest being metallic.

5. Bearing defined in claim 1, characterized in that the resilient support body (2) is unstressed when the bearing is under static load.

6. Bearing defined in claim 1, characterized in that the resilient body (2) is thin-walled at least in part of the zone of its affixation to the housing (4).

7. Bearing defined in claim 1, characterized in that the flow control means is an annular channel (12) with flow control means, said channel being formed in the rest (7).

* * * * *